US008346909B2

(12) United States Patent
Dan et al.

(10) Patent No.: US 8,346,909 B2
(45) Date of Patent: Jan. 1, 2013

(54) METHOD FOR SUPPORTING TRANSACTION AND PARALLEL APPLICATION WORKLOADS ACROSS MULTIPLE DOMAINS BASED ON SERVICE LEVEL AGREEMENTS

(75) Inventors: Asit Dan, Pleasantville, NY (US); Daniel Manuel Dias, Mohegan Lake, NY (US); Richard Pervin King, Scarsdale, NY (US); Avraham Leff, Spring Valley, NY (US); James Thomas Rayfield, Ridgefield, CT (US); Noshir Cavas Wadia, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 10/763,135

(22) Filed: Jan. 22, 2004

(65) Prior Publication Data
US 2005/0165925 A1 Jul. 28, 2005

(51) Int. Cl.
*G06F 15/173* (2006.01)
(52) U.S. Cl. ....................................... 709/224; 709/226
(58) Field of Classification Search ................... 709/224, 709/226
See application file for complete search history.

(56) References Cited

U.S. PATENT DOCUMENTS

| | | | |
|---|---|---|---|
| 5,504,894 A | 4/1996 | Ferguson et al. | |
| 5,799,173 A | 8/1998 | Gossler et al. | |
| 5,841,869 A * | 11/1998 | Merkling et al. | 713/164 |
| 6,058,102 A | 5/2000 | Drysdale et al. | |
| 6,366,563 B1 | 4/2002 | Weldon et al. | |
| 6,459,682 B1 * | 10/2002 | Ellesson et al. | 370/235 |
| 6,597,956 B1 * | 7/2003 | Aziz et al. | 700/3 |
| 6,799,208 B1 * | 9/2004 | Sankaranarayan et al. | 709/223 |
| 7,043,225 B1 * | 5/2006 | Patel et al. | 455/405 |
| 7,051,098 B2 * | 5/2006 | Masters et al. | 709/224 |
| 7,107,496 B1 * | 9/2006 | D'Ippolito et al. | 714/46 |
| 7,228,546 B1 * | 6/2007 | McCarthy et al. | 718/104 |
| 7,330,661 B1 * | 2/2008 | Jackson et al. | 398/118 |
| 7,379,884 B2 * | 5/2008 | Barsness et al. | 705/63 |
| 7,406,691 B2 * | 7/2008 | Fellenstein et al. | 718/104 |

(Continued)

OTHER PUBLICATIONS

S.D'Antonio et al., "A Component-based Approach to SLA Monitoring in Premium IP Networks," available at: http://216.239.53.104/search?q=cache:b6PUisFh7rEJ:www.ist-intermon.org/workshop/papers/07_02_sla_monitoring_final.pdf+A+Component-based+Approach+to+SLA+Monitoring+in+Premium+IP+Networks&hl=en&ie=UTF-8, on Jan. 21, 2004.

(Continued)

*Primary Examiner* — Jeong S Park
(74) *Attorney, Agent, or Firm* — Sawyer Law Group, P.C.

(57) ABSTRACT

An on-demand manager provides an improved distributed data processing system for facilitating dynamic allocation of computing resources among multiple domains based on a current workload and service level agreements. Based on a service level agreement, the on-demand manager monitors and predicts the load on the system. If the current or predicted load cannot be handled with the current system configuration, the on-demand manager determines additional resources needed to handle the workload. If the service level agreement violations cannot be handled by reconfiguring resources at a domain, the on-demand manager sends a resource request to other domains. These other domains analyze their own commitments and may accept the resource request, reject the request, or counter-propose with an offer of resources and a corresponding service level agreement. Once the requesting domain has acquired resources, workload load balancers are reconfigured to allocate some of the workload from the requesting site to the acquired remote resources.

14 Claims, 9 Drawing Sheets

U.S. PATENT DOCUMENTS

| | | | |
|---|---|---|---|
| 2001/0027484 | A1 | 10/2001 | Nishi |
| 2001/0047411 | A1 | 11/2001 | Kurose et al. |
| 2002/0019873 | A1 | 2/2002 | Goldszmidt et al. |
| 2002/0069279 | A1* | 6/2002 | Romero et al. ............... 709/225 |
| 2002/0107743 | A1 | 8/2002 | Sagawa |
| 2002/0124103 | A1 | 9/2002 | Maruyama et al. |
| 2002/0133593 | A1 | 9/2002 | Johnson et al. |
| 2002/0198995 | A1 | 12/2002 | Liu et al. |
| 2003/0009580 | A1* | 1/2003 | Chen et al. ................... 709/231 |
| 2003/0058797 | A1 | 3/2003 | Izmailov et al. |
| 2003/0074347 | A1 | 4/2003 | Phillips |
| 2003/0093537 | A1 | 5/2003 | Tremlett et al. |
| 2003/0208523 | A1* | 11/2003 | Gopalan et al. ............... 709/201 |
| 2004/0030777 | A1* | 2/2004 | Reedy et al. ................... 709/224 |
| 2005/0072618 | A1* | 4/2005 | Gray et al. .................... 180/274 |
| 2005/0102387 | A1* | 5/2005 | Herington .................... 709/223 |
| 2005/0165925 | A1 | 7/2005 | Dan et al. |
| 2005/0188075 | A1* | 8/2005 | Dias et al. ..................... 709/224 |
| 2006/0056607 | A1* | 3/2006 | Halkosaari ............... 379/114.12 |

OTHER PUBLICATIONS

Preeti Bhoj et al., "SLA Management in Federated Environments," Dec. 1998.

Terek F. Abdelzaher, An Automated Profiling Subsystem for QoS-Aware Services, IEEE, 2000.

Anita Mittal et al., Integrated Dynamic of Hard and QoS Degradable Real-Time Tasks in Multiprocessor Systems, Journal of Systems Architecture, vol. 46, No. 9, pp. 793-807, Jul. 2000.

S.D. Antonio et al., A Component- Based Approach to SLA Monitoring in Premium IP Networks, available at http:216.239.53.104/search?q=cache:b6 pulSfH7Rej:www.ist-intermon.org/workshop/papers/07. On Jan. 21, 2004.

Preeti Bhoj et al., SLA Management in Federated Environments, Dec. 1998.

* cited by examiner

METHOD FOR SUPPORTING TRANSACTION AND PARALLEL APPLICATION WORKLOADS ACROSS MULTIPLE DOMAINS BASED ON SERVICE LEVEL AGREEMENTS

FIELD OF THE INVENTION

The present invention generally relates to distributed data processing systems. In particular, it relates to a method for facilitating dynamic allocation of computing resources. More specifically, the present system supports transaction and parallel services across multiple data centers, enabling dynamic allocation of computing resources based on the current workload and service level agreements.

BACKGROUND OF THE INVENTION

Server-clustered server systems are used to provide scalable Web servers for clients operating transaction applications such as, for example, Web-based stock trading. Conventional server-clustered server systems use a Network Dispatcher/TCP router placed operationally in front of a server cluster of Web server nodes. Server-clustered server systems are also used to support parallel-processing tasks such as numerically intensive computing applications or data mining.

An emerging requirement for server-clustered server systems is concurrent support of transaction and parallel types of applications on server clusters, multiple server clusters, or in grid environments. Web based trading and other applications have highly variable loads; the ratio of peak to average traffic can be very high. Server-clustered server systems are typically configured to handle the peak workload. Consequently, conventional server-clustered server systems are relatively idle much of the time. The conventional server-clustered server system is a very inefficient use of computing resources.

One conventional attempt to more efficiently use computing resources in a server-clustered server system optimizes the assignment of work to a single server-cluster of servers. However, this optimization does not consider the service level agreement for each client. Consequently, this approach may optimize the use of the servers in the server cluster but not meet the service level agreements for one or more clients.

Another conventional attempt to more efficiently using computing resources in a server-clustered server system uses priorities to schedule individual requests to a given set of servers. This approach focuses on scheduling individual requests rather than allocating resources for classes of applications. In addition, this approach does not consider the service level agreements of the clients in allocating resources.

Yet another proposed approach utilizes a mechanism for describing service level agreements. This particular approach describes a method for gathering and sharing the data related to a service level agreement to determine whether the service level agreement is being met. However, this approach does not address actions that may be used to compensate current performance so that service level agreements may be met. In addition, this approach does not provide a means whereby different server clusters may accept workloads from one another.

All of the foregoing conventional approaches are formulated to use computing resources in a server-clustered server system focus on a single server cluster based domain, and do not address the issues involving multiple domains. These conventional methods are based either on reserving resources for specific jobs or ad hoc routing of applications to remote nodes.

What is therefore needed is a method that distributes the available capacity of the server cluster, or more generally a grid, among transaction and parallel applications. Transaction applications are comprised of tasks that are small discrete events such as, for example, stock trading transactions. Parallel tasks are numerically intensive tasks such as, for example, a stock portfolio optimization. This method should provide dynamic sharing of resources across a server cluster such that service level agreements may be met when resources are available. The need for such a solution has heretofore remained unsatisfied.

Numerous organizations utilize multiple independently operated domains that typically reside at geographically distributed sites. Sharing resources across domains can result in better overall utilization of computing and personnel resources. Specifically, when resources within a domain have been exhausted and service level agreements can no longer be met using resources within the domain, resources at other domains may be used to satisfy the service level agreements. However, no method currently exists for sharing resources among multiple, potentially remote domains.

What is also needed is a method that distributes the available capacity of the resources across multiple domains, or more generally a grid, among transaction and parallel applications. This method should provide dynamic sharing of resources across multiple domains such that service level agreements may be met when resources are available. The need for such a solution has heretofore remained unsatisfied.

SUMMARY OF THE INVENTION

The present invention satisfies the foregoing need, and presents a system, a service, a computer program product, and an associated method (collectively referred to herein as "the system" or "the present system") for providing an improved distributed data processing system for facilitating dynamic allocation of computing resources. In addition, the present system supports transaction and parallel services across multiple data centers enabling dynamic allocation of computing resources based on the current workload and service level agreements. The present system provides a method for dynamic re-partitioning of the workload to handle workload surges. These workload surges typically occur in the transaction workload.

The present system supports transaction and parallel applications based on service level agreements within a single domain or multiple domains of administration. Specifically, computing resources are dynamically assigned among transaction and parallel application classes, based on the current and predicted workload.

The present system defines a service level agreement for each transaction application and parallel application. Based on the service level agreement, the system monitors the load on the system. Monitoring the system comprises monitoring the transaction rate, the response time, or other metrics as necessary. Optionally, the measured system load for each transaction type is fed to a forecaster or prediction model. This prediction model uses the history and the current load to predict the future load on the system. An analysis component estimates the system utilization and response time based on the current and predicted load.

Based on the service level agreement, the present system determines whether the current or predicted load can be handled with the current system configuration. If the service level agreement is not met, a planning component determines additional resources needed to handle the current or predicted workload. The server cluster is reconfigured to meet the service level agreement.

For example, a surge in the transaction load requires additional servers to support the transaction workload up to the load specified in the service level agreement. The present system may re-capture nodes previously allocated to the parallel workload and reassign them to the transaction workload. Optionally, the present system may configure and setup additional nodes to run the required type of workload. The present system may also configure the routing component to comprise the new node supporting the desired workload.

A principal advantage of the present system is the ability to support both transaction and parallel workloads on the same server cluster. Conventional systems statically assign nodes to either transaction or parallel workloads because the two workloads typically interfere with each other when run on the same system. For example, the parallel application often consumes a lot of memory. Consequently, operating a parallel application on the same nodes as a transaction application, even at a lower priority than the transaction application, causes unacceptable performance degradation of the transaction application.

The present system comprises a service level agreement monitor and an optional prediction model that determines service level agreement violations based on current load or predicted load. The present system also comprises a planning component that determines what changes to the system configuration are needed and an execution component that reconfigures the system to best manage the current or predicted load.

Each domain of administration (or site) defines a set of service level agreements for the workloads supported at that site. Each site monitors the workloads based on the service level agreements and optionally predicts the future workload based on the current and historical load. Service level agreement violation events for current or predicted loads are raised. If the service level agreement violations cannot be handled by reconfiguring resources at a site, a resource request comprising a service level agreement and proposed dollar value are sent to other sites (domains of administration).

The other sites analyze their own service level agreement commitments and current and projected load. Based on this analysis, the other sites may accept the resource request, reject the request, or counter-propose with an offer of resources and a corresponding service level agreement. The requesting site examines the responses, chooses one or more acceptances or counter-proposals and confirms or rejects the offers from the remote sites. Once the requesting site has acquired resources, the workload load balancers are reconfigured to move some of the workload from the requesting site to the acquired remote resources.

An advantage of the present system is the ability to support dynamic surges in workload by acquiring resources at remote sites based on service level agreements. Conventional methods are based either on reservation of resources for specific jobs or ad hoc routing of applications to remote nodes.

The present clustered system may be embodied in a utility program such as a server allocation utility program, and enables the user to specify a performance parameter for the service level agreement. The clustered system user invokes the service allocation utility expecting the fulfillment of the to reallocate local computing resources to meet the service level agreement in the event that a violation of the service level agreement is detected. In the event that local computing resources are insufficient to mitigate the violation of the service level agreement, the server allocation utility clustered system requests additional computing resources from a plurality of remote clustered servers. In one embodiment, local computing resources are reallocated or remote computing resources are requested by the service allocation utility when the service allocation utility predicts a violation of the service level agreement. The user receives a level of performance by the clustered system that meets the service level agreement while the clustered system is performing the transaction applications and the parallel applications on behalf of the user.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
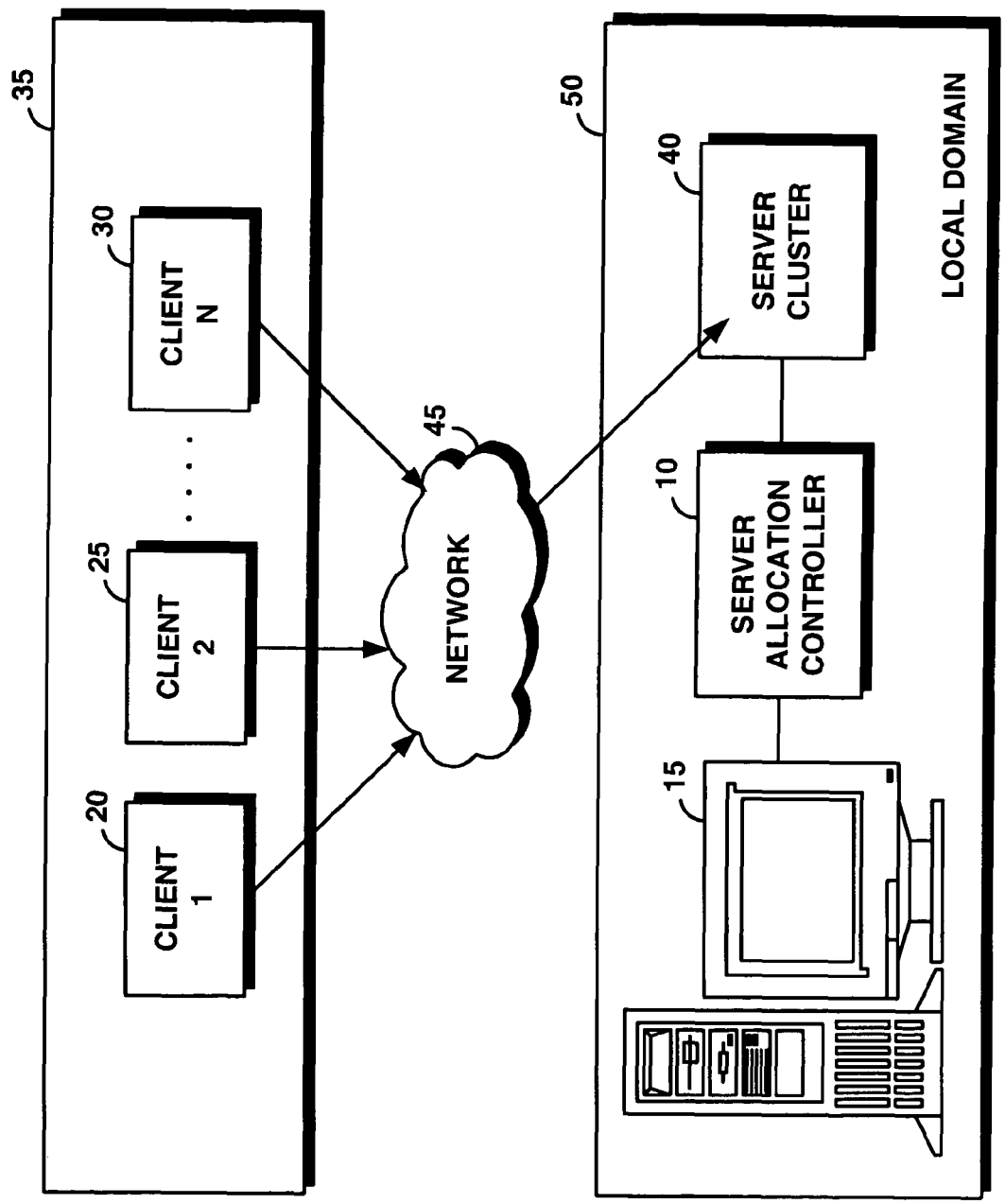
FIG. 1 is a schematic illustration of an exemplary operating environment in which a server allocation controller of the present invention can be used.

FIG. 1 portrays an exemplary overall environment in which a system and associated method for supporting transaction and parallel services in clustered systems based on service level agreements according to the present invention may be used. A server allocation controller 10 comprises a software programming code or a computer program product that is typically embedded within, or installed on a server 15. Alternatively, the server allocation controller 10 can be saved on a suitable storage medium such as a diskette, a CD, a hard drive, or like devices.

Clients, such as client 1, 20, client 2, 25, client 3, 30, are collectively referenced as clients 35, and access a server cluster 40 via a network 45. Server 15 defines and supports a set of service level agreements corresponding to a mixture of transaction and parallel services running on the server cluster 40. Clients 35 invoke these services by making requests to the server cluster 40 through network 45.

The server cluster 40 supports a set of workloads that represent requests from different clients 35 and workload types, each with a service level agreement. For example, the server cluster 40 may have a transaction workload type as well as a parallel workload type. A local domain 50 comprises the server cluster 40, the server 15, and the server allocation controller 10.

Figure 2:
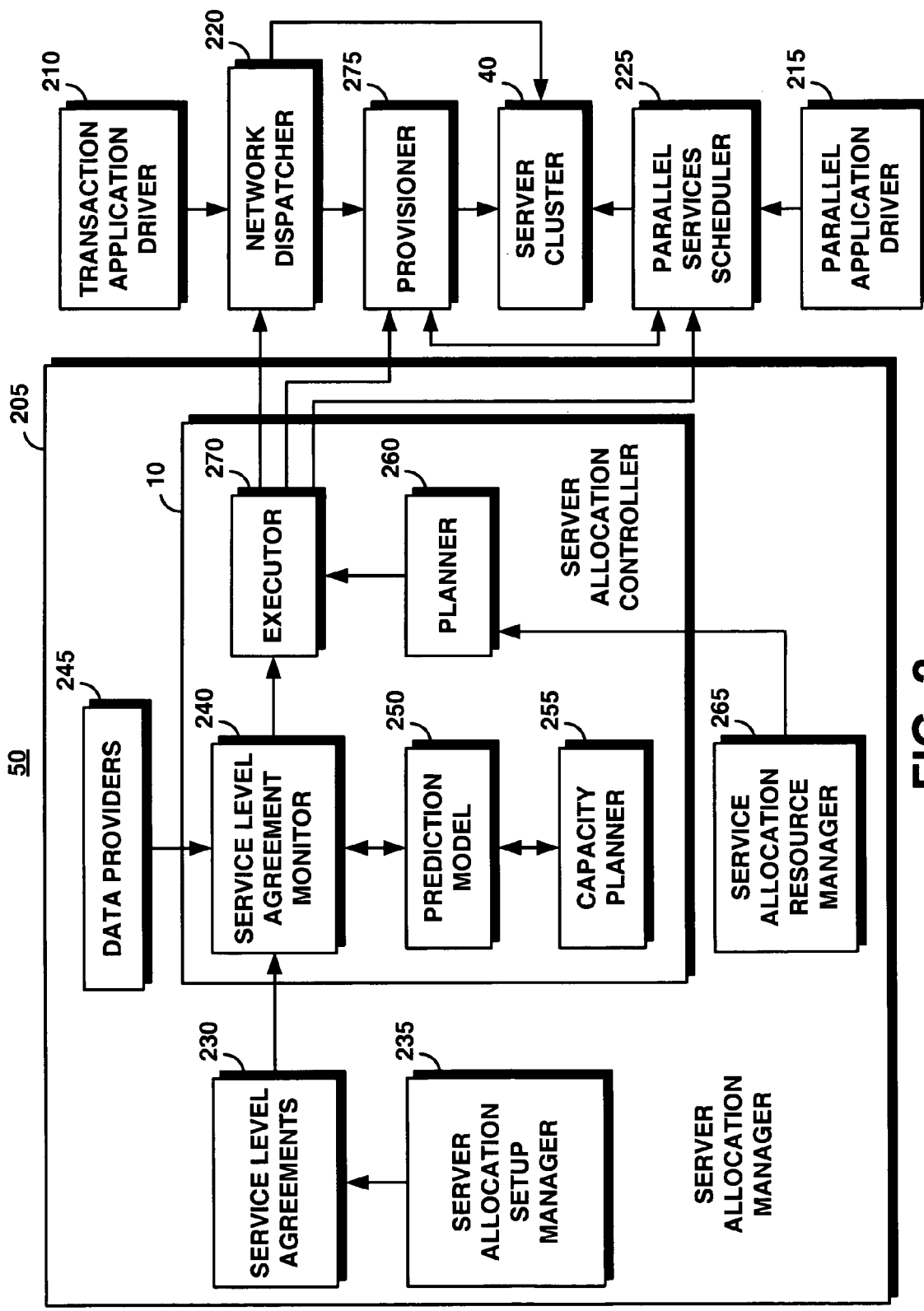
FIG. 2 is a block diagram of the high-level architecture of the server allocation controller of FIG. 1.

A high-level hierarchy of the server allocation controller 10 is illustrated by the diagram of FIG. 2. A server allocation manager 205 comprises the server allocation controller 10. For exemplary purposes, workloads for the server cluster 40 are a transaction application driver 210 and a parallel application driver 215.

The server allocation manager 205 may manage additional workloads not shown. Some of these additional workloads may be transaction applications and some may be parallel applications. Parallel applications are typically numerically and processing intensive, requiring large amounts of memory. An example of a parallel application is a stock portfolio optimization.

Transaction applications are typically events such as stock transactions that are not processing intensive. The transactional application as whole may be spread over a number of servers. Each individual transaction typically runs on one server. The stock trading application has multiple transactions from different clients 35 that can run concurrently on different servers accessing the same database.

Each application type has a dispatcher or scheduler used to route requests to one or more servers (also referred to as nodes) in the server cluster 40. The server allocation manager 205 assigns nodes to the transaction applications or the parallel applications. A node may not be shared by the transaction applications or the parallel applications because they interfere with each other.

For example, the transaction application requests from the transaction application driver 210 may be routed to nodes in the server cluster 40 by a network dispatcher 220. Similarly, the parallel workload from the parallel application driver 215 may be scheduled on servers in the server cluster 40 by a parallel services scheduler 225.

Service level agreement s230 are defined for each workload. Optionally, the service level agreements 230 may be defined for a subset of the workloads. The service level agreements 230 are negotiated with each of the clients 35 and implemented by a server allocation setup manager 235.

The server allocation manager 205 assigns nodes to various workloads based on the service level agreements 230. The service level agreements 230 specify performance elements to be provided by the server cluster 40 to clients 35. These performance elements comprise the throughput for each application that is supported and, optionally, the response time for the specified throughput.

The service level agreements 230 may comprise various other clauses, conditions and rules, such as availability or downtime. The service level agreements 230 may also comprise different classes of workloads within an application and the service level agreements 230 for these different classes of workloads. In addition, the service level agreements 230 may comprise penalty functions if the clauses in the service level agreements 230 are violated, etc. Typically the server allocation manager 205 manages many service level agreements 230 at any one time.

A service level agreement monitor 240 is dynamically configured to monitor the workload and system elements to determine whether the service level agreements 230 are being satisfied. The service level agreement monitor 240 is given information about each of its set of workloads through one or more data providers 245. The data providers 245 give information about the current state of the workloads with respect to conditions of interest to one or more of the service level agreements 230. Parameters monitored by the service level agreement monitor 240 may comprise the transaction rate, transaction response time, availability, server cluster node utilization, etc. If the service level agreements 230 are not being met, the service level agreement monitor 240 flags a violation event.

A set of nodes in the server cluster 40 is assigned to each workload; this assignment is typically based on the average load on the server cluster 40. The service level agreement monitor 240 determines if the service level agreements 230 are being met for the current workload and nodes assigned to the corresponding workloads. Optionally, the service level agreement monitor 240 passes the monitored information to a prediction model 250. The prediction model 250 projects into the future the estimated workload such as throughput. Forecasting by the prediction model 250 may be short term (i.e., seconds, minutes, or hours) or long term.

The prediction model 250 also estimates the response time, system utilization or other measure based on the predicted workload. Based on the output of the prediction model 250, the service level agreement monitor 240 may optionally determine if projections indicate that the service level agreements 230 may not be met.

In one embodiment, higher and lower utilization or throughput levels are set, and a node is added or subtracted if the threshold is crossed. The problem is that (i) the thresholds are static, and (ii) if the load crosses the threshold for a short period of time, oscillation can result. According to the present invention, in one dimension, the threshold varies by the number of nodes allocated to a particular transactional workload.

The reason is that, when a node is added, going from one to two nodes, the utilization or throughput per node is halved. As a result, when two nodes are allocated to a workload, going up from one, the lower threshold must be less than one half of the upper threshold that was allocated for one node.

If the upper threshold for k nodes allocated is t_upper(k) and the lower threshold for k+1 nodes is t_lower(k+1), then:

$$t\_lower(k+1)*(k+1) < t\_upper(k)*k.$$

One method is to set t_lower(k+1)=upper(k)*f*k/(k+1), where f<1, for example f=0.8 would allow a 20% variation reduction in the load without decreasing the number of nodes. If the lower threshold is not reduced with increase in the number of nodes, then the allocation of nodes becomes excessive for large clusters.

On the other hand, as t_lower is increased, the probability of oscillation grows. The fraction f can be adjusted dynamically, depending on the degree of normal variation in the load over a period of time t_measure, where t_measure depends on how quickly a node can be added or subtracted, and the impact on the system caused by this change. For example, if it takes 5 minutes to allocate a new node and cache required data, then the ratio of the minimum to the maximum load in 5-minute intervals can be used to set f.

To minimize the oscillation, the time below t_lower(k) is increased, i.e., the load must fall below the lower threshold for a period of time t_hold, before action is taken to reduce the number of nodes. If the load again increases above t_lower(k) within the t_hold time period, the count is reset, so that the load must fall below t_lower(k) for t_hold again.

The time t_hold can be adjusted dynamically, so that t_hold is increased if large variations in load that would cause oscillation are observed. Since a short spike in (increased) load can cause the t_upper(k) to also be exceeded, a different t_hold_upper and t_hold_lower can be set. Typically:

$$t\_hold\_upper <= t\_hold\_lower$$

because the effect of overload can be more detrimental than underload.

Performance predictions of the prediction model 250 may optionally be sent to a capacity planner 255. The capacity planner 255 determines the server capacity required of the server cluster 40 based on the predictions of the prediction model 250.

Performance predictions of the prediction model 250 are also sent to the service level agreement monitor 240. The service level agreement monitor 240 determines whether the local domain 50 may miss a service level in the future, based on the predicted value. The service level agreement monitor 240 obtains current performance values and optional predicted values and can flag violations of the service level agreements 230 based on either current or future predictions.

Given a current or predicted violation of any of the service level agreements 230, a planner 260 determines a response to the violation. This response is a plan for allocating the servers in the server cluster 40 to the transaction and parallel requests to minimize cost to the local domain 50. Planner 260 can decide to meet all the service level agreements 230. Otherwise, planner 260 adjusts the workload for each of the servers in the server cluster 40 based on one or more policies.

A policy implemented by planner 260 may adjust the workloads based on priority. Planner 260 may specify that a certain transaction class is more important than another. In an embodiment, a minimum and maximum number of servers are allocated to each workload so other workloads are neither "starved" nor does any one workload receive all the resources of the server cluster 40.

Planner 260 obtains information on the current assignments of the servers in the server cluster 40 from a server allocation resource manager 265. This information may comprise priorities, allocations, etc. Planner 260 then determines a server reallocation plan to best minimize costs of the local domain 50. For example, planner 260 may decide to violate the service level agreements 230 for one workload in favor of not violating the service level agreements 230 for another workload. Planner 260 may decide to violate the service level agreements 230 for an important workload to accommodate the additional processing required for a spike in stock trades that occurs after the chairman of the Federal Reserve Board makes a speech.

The reallocation plan created by planner 260 is sent to an executor 270. This reallocation plan may comprise information on server allocations and allocation of specific loads to specific servers in server cluster 40. Executor 270 reconfigures the server cluster 40 as directed by planner 260. Executor 270 calls provisioner 275 if one or more servers require provisioning.

For example, planner 260 may determine that one additional server may be allocated to the stock trading transaction workload and one server may be removed from the parallel application workload. Provisioner 275 informs the parallel services scheduler 225 to stop using a specific server, server A. The parallel services scheduler 225 informs provisioner 275 when it releases server A. Executor 270 may then call provisioner 275 and request that server A be assigned to the stock trading transaction workload. Provisioner 275 then installs the stock trading application on server A. Executor 270 then informs the network dispatcher 220 of the change in server configuration, allowing the network dispatcher 220 to use server A.

In another embodiment, the server allocation controller 10 may add one node at a time to the workload. If the service level agreements 230 are not met with the additional node, the server allocation controller 10 may assign additional nodes to a workload, one at a time, until the service level agreements 230 are met. In a further embodiment, the server allocation controller 10 may add nodes to a workload, one at a time, if the prediction model 250 predicts that the server cluster 40 may not meet the service level agreements 230.

The service level agreement monitor 240 may determine that the service level agreement s230 for one or more other workloads on the server cluster 40 can be met with fewer nodes. If so, executor 270 reconfigures the network dispatcher 220 or the parallel services scheduler 225 for that workload; this reconfiguration stops dispatching to a specific node or set of nodes. Executor 270 uses the computed plan from planner 260 to reconfigure the server cluster 40 to handle the current or predicted load. Concurrently, the network dispatcher 220 or parallel services scheduler 225 for the workload projected to need additional nodes is reconfigured to add that specific node or set of nodes.

The service level agreement monitor 240 may determine that fewer nodes cannot meet the service level agreements 230 for other workloads. In this case, additional nodes cannot be assigned to the workload needing additional nodes from any of the other workload. In an embodiment, the server allocation controller 10 may request or configure new nodes. The server allocation controller 10 then assigns these new nodes to the workload that needs the additional nodes.

If additional nodes are not available to meet all the service level agreements 230 for the current or projected workload, the server allocation controller 10 uses an internal policy to determine priorities for service level agreements 230 that may be violated. For example, this prioritization may be performed based on minimizing the penalty associated with violating service level agreements 230. The server allocation controller 10 then removes nodes from the workload with lower penalty or lower priority and assigns these nodes to the workload with higher penalty or higher priority.

Figure 3A:
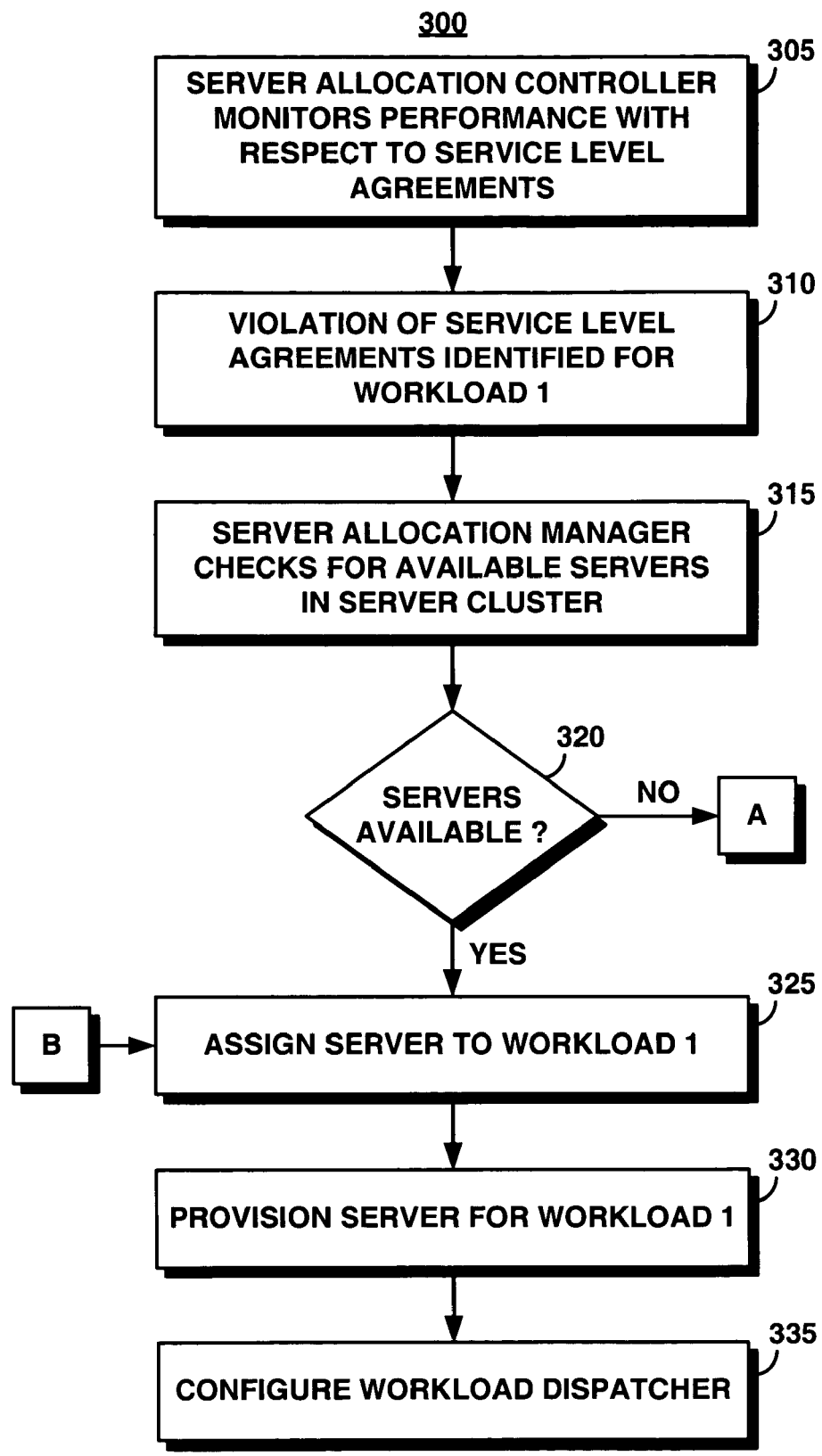
FIG. 3 is comprised of FIGS. 3A and 3B, and represents a process flow chart illustrating a method of operation of the server allocation controller of FIGS. 1 and 2.
Figure 3B:
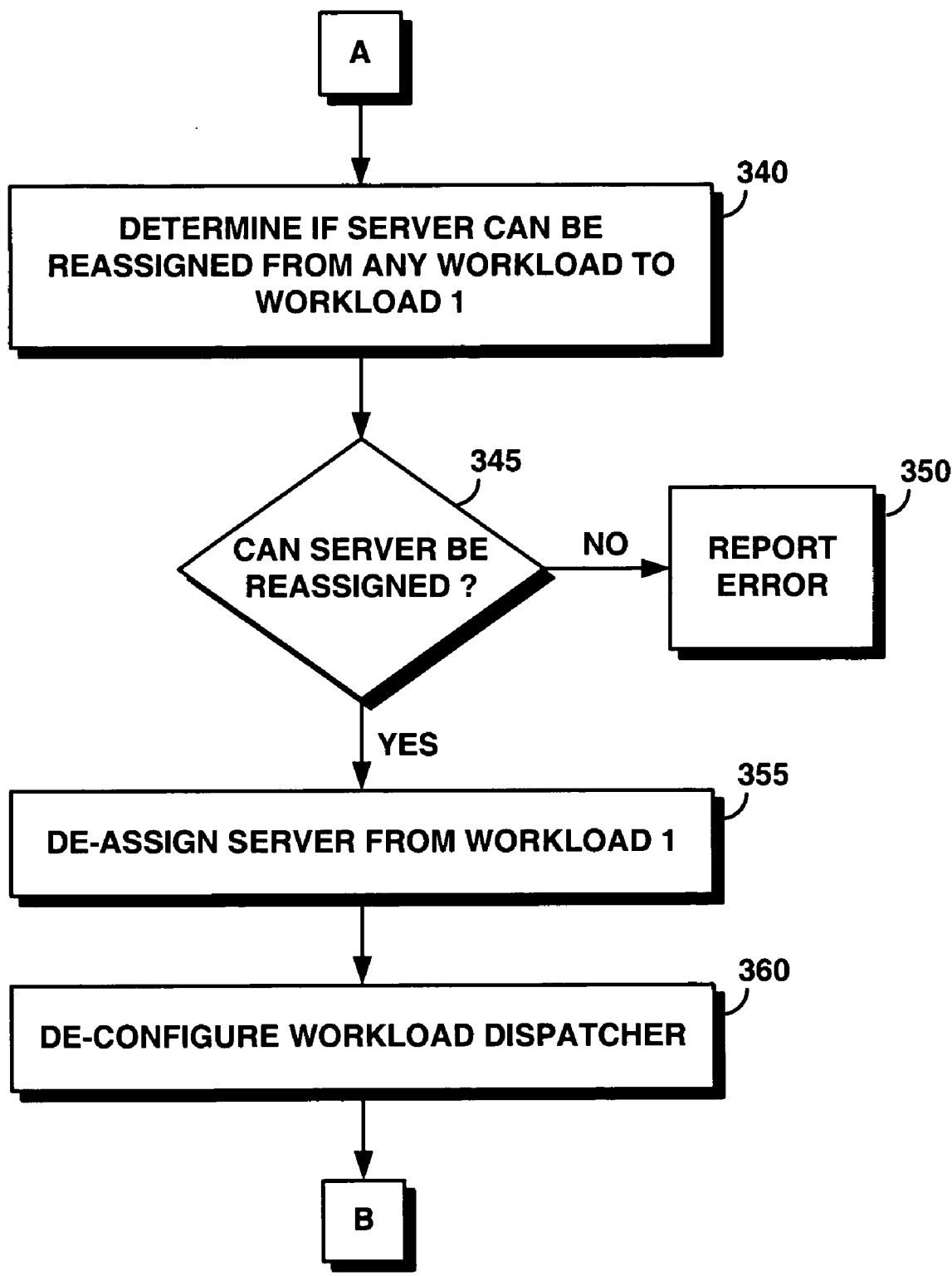

A method 300 for managing server allocations to minimize penalties and maximize system performance is illustrated by the process flow chart of FIG. 3 (FIGS. 3A, 3B). The server allocation controller 10 monitors performance with respect to the service level agreements 230 at step 305. The service level agreement monitor 240 identifies a violation of the service level agreements 230 for a workload, workload 1, at step 310. This violation may be a current violation or a predicted violation. The server allocation manager 205 checks for available servers in the server cluster 40 at step 315 that may be allocated to workload 1.

If at decision step 320 additional servers are available in the server cluster 40, executor 270 assigns those available servers to workload 1 at step 325. Provisioner 275 optionally provisions the available server for workload 1 at step 330; the available server may already be provisioned for workload 1. Executor 270 configures the appropriate workload dispatcher at step 335 to enable dispatching workload 1 to the available server.

If the server allocation manager 205 determines at decision step 320 that no additional servers are available, a server may be reallocated to workload 1 from some other workload, for example, workload 2. The server allocation manager 205 determines within the policy of the local domain 50 whether a server can be allocated from any workload to workload 1 at step 340 (FIG. 3B). Reassignment determinations comprise consulting with the current allocation, reviewing the policy in terms of workload parity, and deciding whether a server can be reassigned from some other workload. If at decision step 345 a server cannot be reassigned, the server allocation manager 205 reports an error at step 350. At this point, a violation of the service level agreements 230 can neither be avoided nor mitigated within the policy of the local domain 50.

If at decision step 345 a server can be reassigned, executor 270 de-assigns a server at step 355 from workload 2. At step 360, executor 270 de-configures the appropriate workload dispatcher of the server that is being de-assigned. Method 300 then proceeds with steps 325, 330, 335 in assigning the newly available server from step 355 to workload 1.

In an embodiment, a minimum number of nodes in the server cluster 40 may be assigned to each workload, with the remainder in a shared pool of nodes. For example, the nodes in the server cluster 40 may support a transactional workload and a parallel application. An exemplary policy may assign a minimum number of nodes to each workload, e.g. one node minimum to each workload. The remaining nodes are in a shared pool of nodes that may be assigned to either workload. Any one node may not be assigned to both workloads at the same time.

An exemplary policy for managing the shared pool may provide priority to the transaction workload, provided the maximum throughput defined by the service level agreements 230 are not exceeded. Method 300 is then used to dynamically allocate nodes in the shared pool to one of the workloads based on the current and predicted load, and the service level agreements 230.

In another embodiment, servers in the server cluster 40 comprise several categories. Servers may be workload nodes that are currently serving a specific workload type. Alternatively, servers may be provisioned nodes that are provisioned to accept requests from a particular workload class but are currently not serving that workload. However, the workload balancer for that workload is configured to not route workload from that class to the provisioned node. Servers may be uninitialized nodes that have the application and its prerequisites installed (e.g. Linux, DB2, WebSphere, application), but not initialized, so as not to consume any computing resources. Further, servers may be uninstalled nodes that do not have that application and its prerequisites installed.

The server allocation controller 10 allocates and assigns a number of nodes in each category, based on forecasting and prediction of workloads in each class. Workload nodes assigned are based on current load. Provisioned nodes are assigned based on the expected fluctuation in load or predicted load in a time frame less than that for starting up the middleware and application. Uninitialized nodes are assigned assuming the expected fluctuation in load will occur in a time frame less than the time to provision and set up the operating system, middleware, and application.

A further embodiment of the server allocation controller 10 supports the service level agreements 230 for multiple transaction workloads. Penalties are assigned for not supporting the service level agreements 230 at various levels. When all the service level agreements 230 cannot be met, resources are allocated based on optimizing performance while minimizing the aggregate penalty function. This embodiment utilizes the prediction model 250 and the capacity planner 255 to base the server allocation on both on the current workload and the predicted workload.

The network dispatcher 220 uses various criteria such as, for example, a load-balancing algorithm to route the requests of clients 35 to one of a set of processing nodes in the server cluster 40. Under moderate load conditions, the local domain 50 can provide clients 35 with service levels that satisfy the previously negotiated service-level agreements 230 using only its set of node resources in the server cluster 40. Under unusual conditions such as, for example, spikes in the load level of clients 35, the resources of the server cluster 40 may not suffice to satisfy one or more of the service level agreements 230. Consequently, an on-demand manager 400 may be used to share workloads on the local domain 50 among other domains, as illustrated in FIG. 4.

Figure 4:
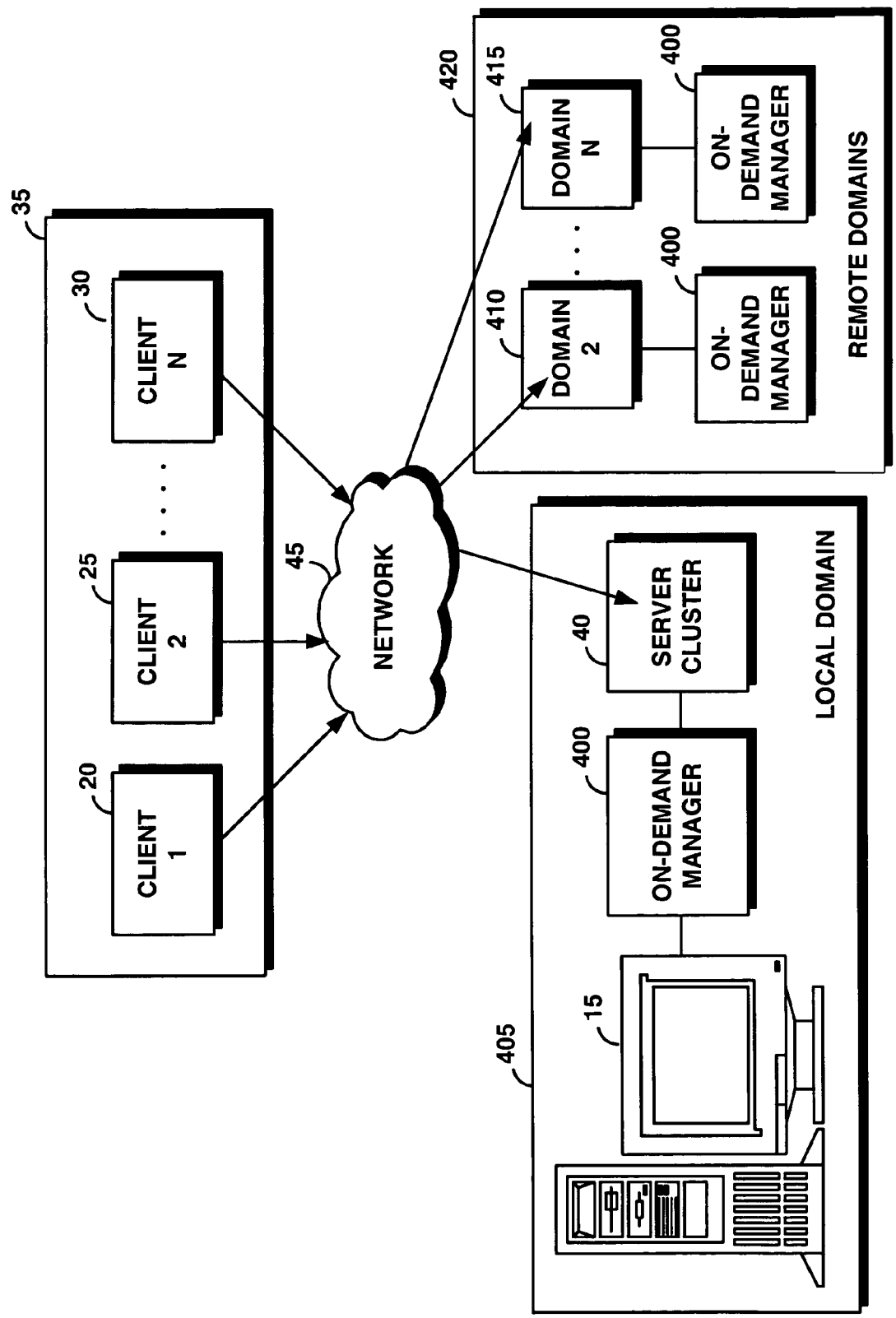
FIG. 4 is a schematic illustration of an exemplary operating environment in which an on-demand manager of the present invention can be used.

FIG. 4 illustrates an exemplary overall environment in which a system, method, and service for supporting transaction and parallel services across multiple domains based on service level agreements may be used. The on-demand manager 400 comprises a software programming code or a computer program product that is typically embedded within, or installed on server 15. Alternatively, the on-demand manager 400 can be saved on a suitable storage medium such as a diskette, a CD, a hard drive, or like devices.

The local domain 405 is comprised of the on-demand manager 400, the server cluster 40, and server 15. Remote domains are represented by domain 2, 410, through domain N, 415. Domains 2, 410, through domain N, 415, are collectively referenced as remote domains 420. The remote domains 420 each comprise the on-demand manager 400.

The local domain 405 and the remote domains 420 define and support a set of service level agreements corresponding to a mixture of transactional and parallel services across multiple domains. Clients 35 invoke these services by making requests to a domain such as the local domain 405 through network 45. The local domain 405 and the remote domains 420 are assigned a set of workloads that represent requests from different sets of clients 35 and workload types, each with a service level agreement. For example, the local domain 405 and the remote domains 420 may have a transactional workload type as well as a parallel workload type. Other workload classes may be defined. For example, within each workload type there may be multiple client types. These client types may comprise different service level agreements representing various levels of performance guarantees.

The on-demand manager 400 is responsible for monitoring the workloads associated with the service level agreements and may optionally predict future workload. If the on-demand manager 400 detects a violation of a service level agreement, the on-demand manager 400 reconfigures the resources of local domain 405 to ensure that it does not remain in a detected violation state or enter a predicted violation state. The on-demand manager 400 addresses the situation where local resources are insufficient for demands by clients 35.

Figure 5:
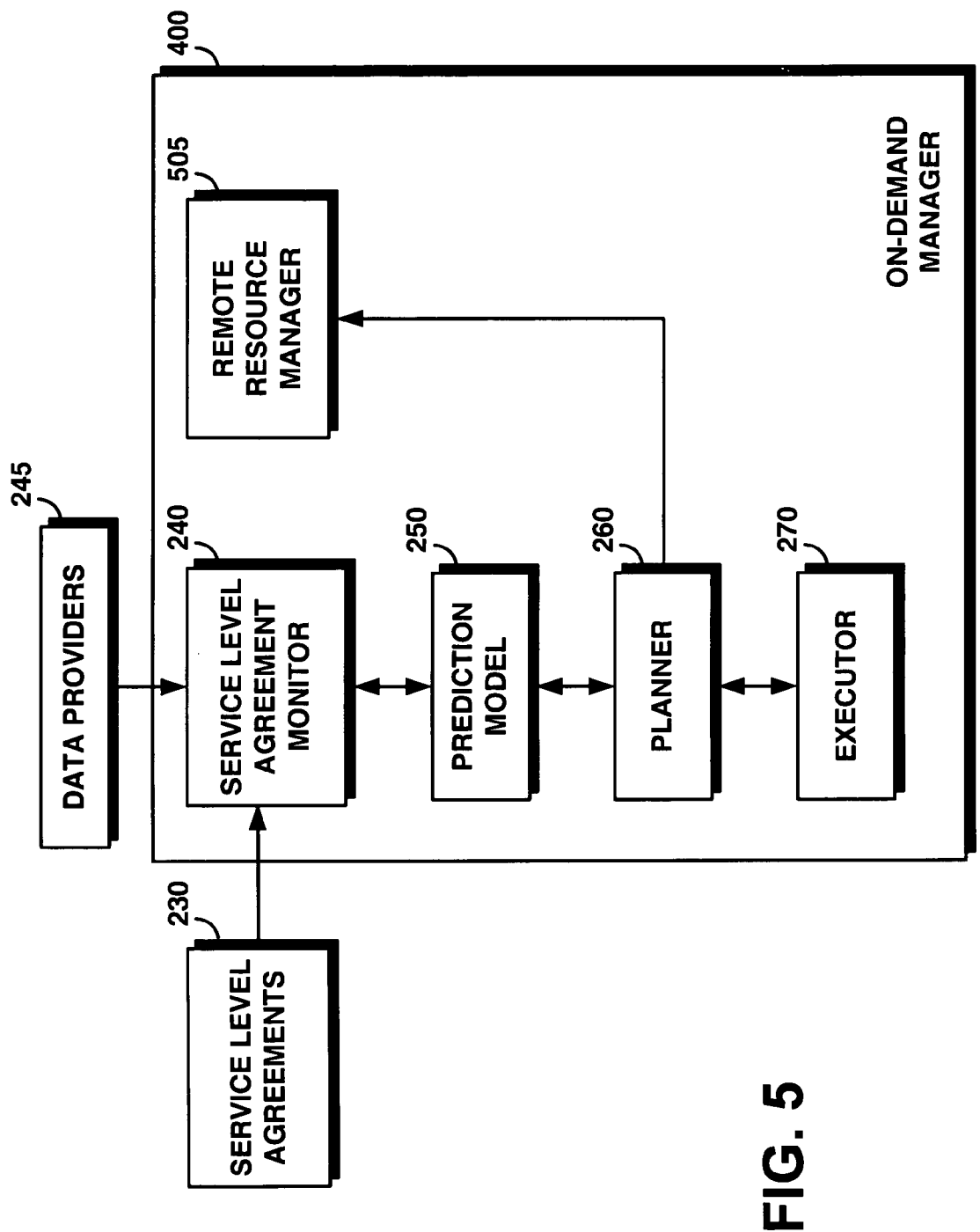
FIG. 5 is a block diagram of the high-level architecture of the on-demand manager of FIG. 4.

A high-level hierarchy of the on-demand manager 400 is illustrated by the diagram of FIG. 5. The on-demand manager 400 comprises the service level agreement monitor 240 and executor 270. The on-demand manager 400 optionally comprises the prediction model 250 that determines whether any of the monitored service level agreements 230 that are being violated may be violated in the future.

The service level agreement monitor 240 is given information about each of its set of workloads through one or more data providers 245. The data providers 245 give information about the current state of the workloads with respect to the service level agreements 230. Planner 260 determines what changes to the current system configuration are needed to properly deal with actual or predicted violations of the service level agreements 230. Executor 270 uses the computed plan to reconfigure the system to best handle the current or predicted load.

If violations of the service level agreements 230 cannot be handled by locally reconfiguring the resources of the local domain 405 (as in method 300 of FIG. 3), a remote resource manager 505 issues a request for the needed resources to one or more of the remote domains 420. The request comprises the service level agreements 230 that are being or may be violated and a proposed monetary value. The remote domains 420 analyze commitments to their own service level agreements 230 in addition to current and projected loads. Based on this analysis, the remote domains 420 may accept the request for resources, reject the request, or counter-propose an offer of resources and corresponding service level agreements 230.

The remote resource manager 505 in the local domain 405 examines the responses, chooses one or more acceptances or counter-proposals, and confirms or rejects the offers from the remote domains 420. Once resources are thus acquired, executor 270 reconfigures the enhanced resource set to move some of its workload from resources in the local domain 405 to resources in the selected remote domain 420.

Figure 6A:
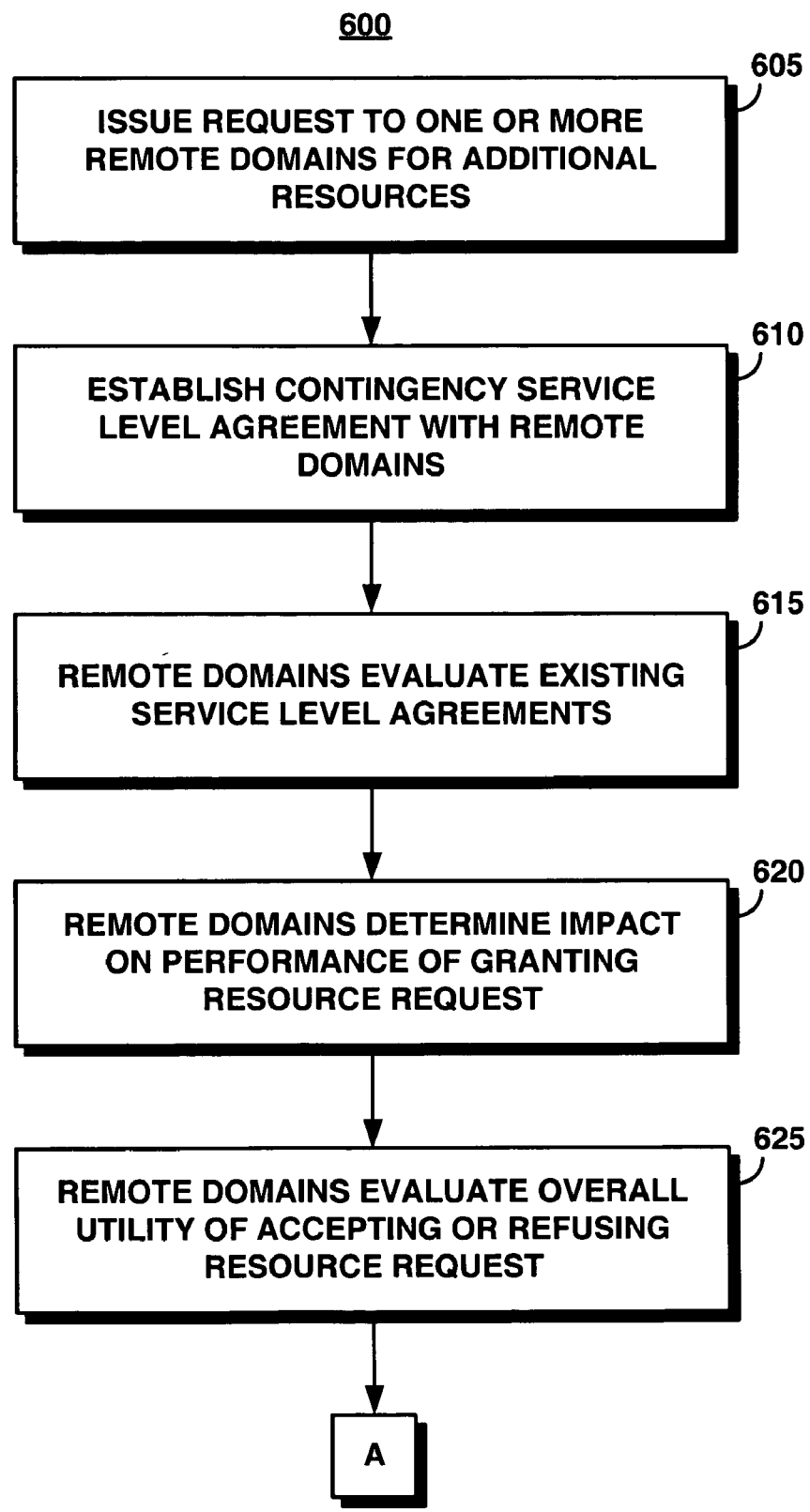
FIG. 6 is comprised of FIGS. 6A and 6B and represents a process flow chart illustrating a method of operation of the on-demand manager of FIGS. 4 and 5.
Figure 6B:
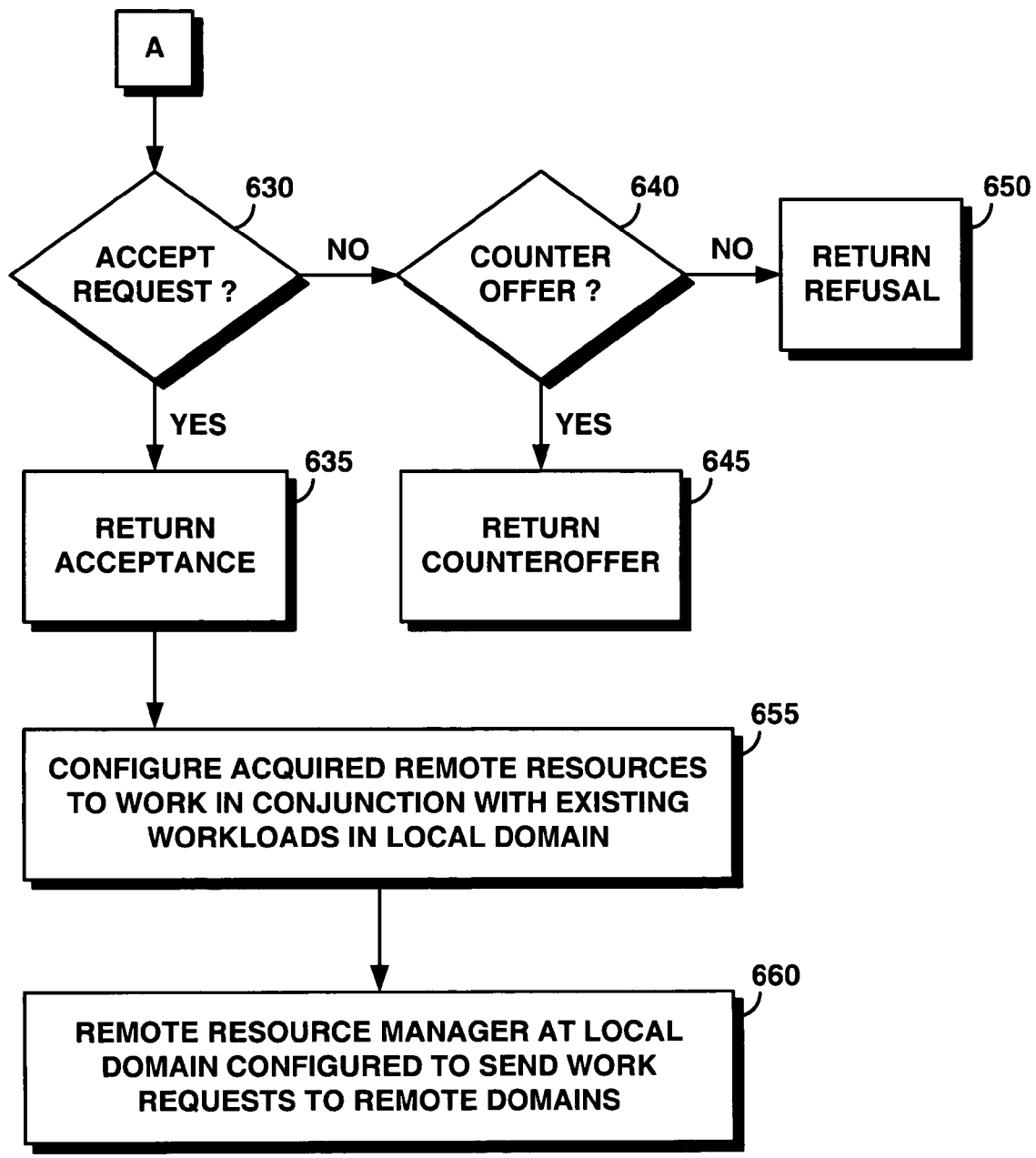

A method 600 of the on-demand manager 400 is illustrated by the process flow chart of FIG. 6 (FIGS. 6A and 6B). The process of detecting or predicting violations of the service level agreements 230 and responding within the local domain 405 is similar to method 300 of FIG. 3. However, when unable to locally resolve the violation of the service level agreements 230, the on-demand manager 400 provides capability to locate and use resources from the remote domains 420. The method 600 replaces the report error step (step 350) in method 300 of FIG. 3.

The on-demand manager 400 requests additional resources from one or more of the remote domains 420 at step 605. This request may be structured, for example, to meet all the committed service level agreements 230 at the local domain 405 that may not be met with available local resources. To form this request between the local domain 405 and the remote domains 420, a contingency service level agreement is established at step 610.

The resource request comprises the contingency service level agreement proposal, the computing resources requested, duration of the resource request, and optionally a dollar value or a utility function that may be realized if the request were granted. There may be many different interpretations for a dollar value associated with a request. For example, this dollar value may be the penalty that may result if the resource were not acquired because pre-established service level agreements at the local domain 405 may be violated.

In addition, the dollar value associated with a request may be the amount that the local domain 405 is willing to pay the remote domains 420 for the requested resource and service level agreement. The dollar value associated with a request may also be the benefit realized by a single organization that owns the local domain 405 and the remote domains 420.

On receiving the resource request from the local domain 405, the remote domains 420 evaluate their existing service level agreements at step 615. The remote domains 420 then determine the impact of granting the resource request on their own existing service level agreements at step 620. This evaluation may be based on the current load and predicted load for all the existing service level agreements of the remote domains 420 and an estimation of the probability of violating existing service level agreements of the remote domains 420.

The remote domains 420 evaluate the overall utility derived by accepting or refusing the resource request from the local domain 405 at step 625. This overall utility is based on the proposed dollar amount or utility function from the local domain 405 and the probability of a penalty due to violation of any of the existing service level agreements of the remote domains 420 due to the contingency service level agreement. At decision step 630 (FIG. 6B), the remote domains 420 determine whether to accept the request for resources from the local domain 405. The remote domains 420 may accept the offer at decision step 630 and return an acceptance to the local domain 405 at step 635.

If the remote domains 420 do not accept the request (decision step 630), the remote domains 420 may return a counter offer to the local domain 405 (decision step 640). If the remote domains 420 return a counter offer to the local domain 405 at step 645, the counter offer may comprise, for example, a different resource quantity, duration, dollar value, or utility function. If the remote domains 420 do not wish to counter offer at decision step 640, the remote domain 420 return a refusal to the local domain 405 at step 650.

The local domain 405 may send resource requests in parallel to multiple remote domains 420. In this case, a two-phase commit protocol is used to confirm establishment of a service level agreement. The local domain 405 may select from multiple responses before committing to one or more service level agreements satisfying the requests. The local domain 405 may send a rejection to those multiple remote domains 420 not selected.

Once the local domain 405 has acquired computing resources from one or more remote domains 420 (step 635), the acquired resources are configured to work in conjunction with the existing workloads in the local domain 405 at step 655. For example, a computing node acquired from the remote domains 420 may require a web application server. The remote resource manager 505 at the local domain 405 may be reconfigured to send work requests to the remote domains 420 at step 660.

A resource acquired by the local domain 405 at the remote domains 420 may be released at the end of the service level agreement duration. The remote domains 420 may also reclaim the resource acquired by the local domain 405 before the end of the duration of the service level agreement because, for example, the remote domain 420 received an unexpected surge in workload. In addition, the local domain 405 may request early release of the acquired resource because, for example, the workload subsided before the duration of the service level agreements with the remote domains 420 expired. As an option, reclamation of a resource or early release of a resource may have associated penalties, monetary or otherwise.

For example, the local domain 405 may experience a penalty if utilization of resources rises to the point where performance may fall below a certain, previously agreed level. From the utilization of the resources currently in use in the local domain 405, the on-demand manager 400 determines the resources necessary to maintain the desired level of utilization and the desired performance. The on-demand manager 400 on the local domain 405 sends a request to the remote domains 420 indicating the desired amount of resources and the cost of the penalty as the offered payment for use of those resources.

The on-demand manager 400 on the remote domain 420 determines the penalties it may incur given its own prior commitments for any amount of resources handed to the local domain 405. The remote domain 420 then sends a counter-proposal to the local domain 405. This counterproposal comprises the amount of resources available to the local domain 405 and corresponding fees the remote domains 420 may charge. If the local domain 405 has sent proposals to multiple domains, local domain 405 can combine these counterproposals by, for example, selecting the least expensive resources first. The local domain 405 may then incrementally add to those resources from other domains in a manner that minimizes cost to the local domain 405.

The local domain 405 may have multiple service level agreements 230 that can impose penalties. In addition, the service level agreements 230 of the local domain 405 may have more complicated penalty clauses. For these scenarios, the utility function of the local domain 405 is more complex than the simple case of requesting resources to meet a need. The utility function of the local domain 405 can be represented as a multi-stepped function with no value given to receiving no resources from the remote domains 420 at one step. The next step and additional steps in the utility function may represent the amount of penalty avoided at each resource level that makes possible the avoidance of that penalty.

For example, the local domain 405 may be penalized $10 by customer X unless five nodes are added to the set of nodes used by that customer. The local domain 405 may also be penalized $15 unless ten more nodes are assigned to customer Y. The utility function expressing these penalty steps may be expressed as follows:

from 0 to $10 at 5 nodes, giving these 5 nodes to customer X;
from $10 to $15 at 10 nodes, giving these 10 nodes to customer Y; and
from $15 to $25 at 15 nodes, meeting the needs of customer X and Y.

The local domain 405 need only communicate "$25 for 15 nodes" to the remote domains 420. The calculations by the on-demand manager 400 at the remote domains 420 are as described for the local domain 405, creating a similar multi-stepped function. The remote domains 420 use this function to counter the offer from the local domain 405. To maximize profits, the on-demand manager 400 at the remote domains 420 performs this same incremental allocation of resources, balanced by costs, previously described at the local domain 405.

The on-demand manager 400 assumes determinism in the workload projections. Probabilistic estimates of workload can be taken into account by computing the expected utility to the local domain 405 of acquiring additional resources from the remote domains 420. For example, if there is a 30% probability that five more nodes are needed to avoid a $10 penalty and a 70% probability that eight more nodes are needed to avoid that penalty, then the expected utility function of the local domain 405 steps from $0 to $3 at five nodes, and up to $10 at eight nodes.

Figure 7:
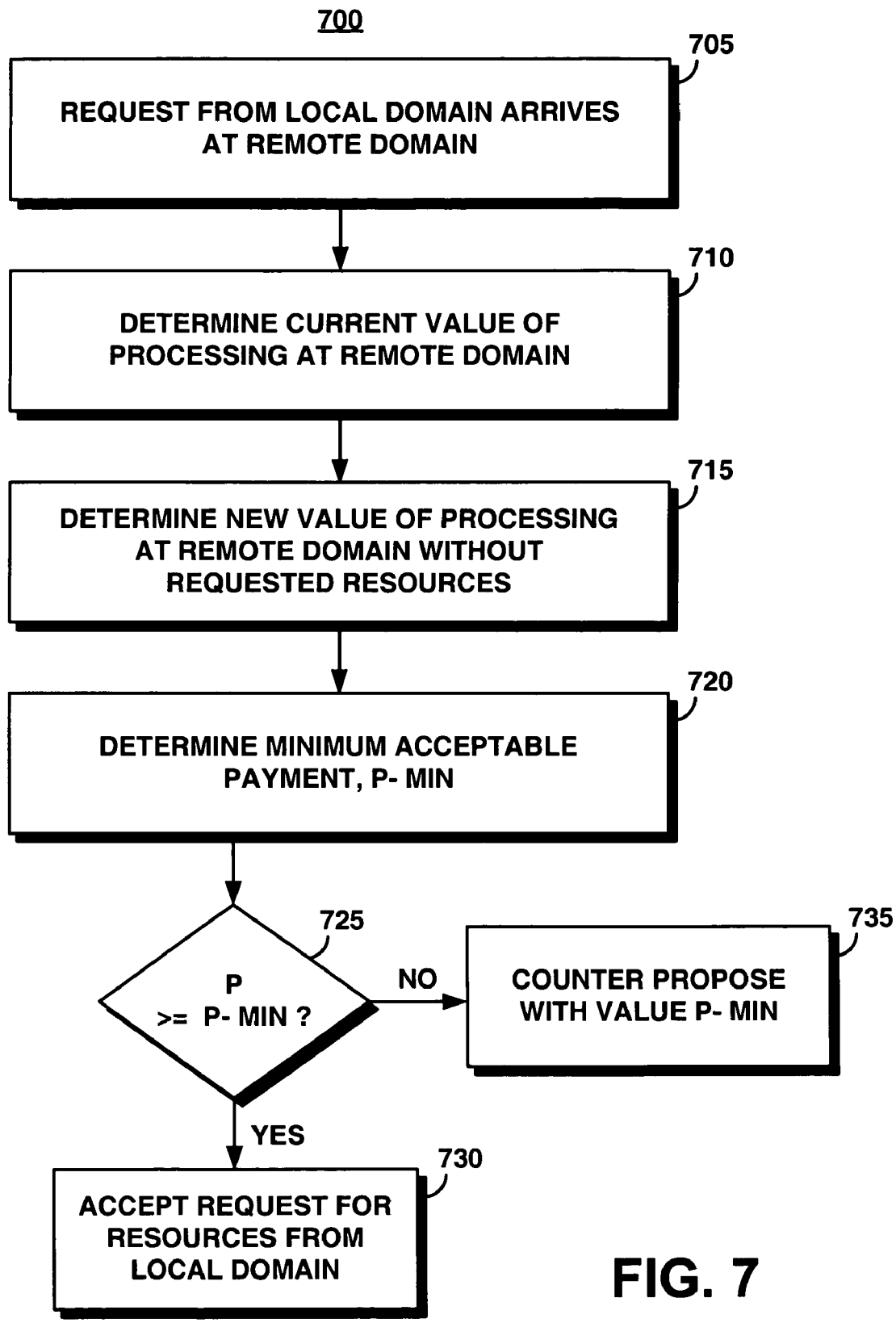
FIG. 7 is a process flow chart illustrating a method of operation of the on-demand manager of FIGS. 4 and 5 in analyzing the value of a request for resources.

A method 700 for processing at a remote domain 420 are illustrated by the process flow chart of FIG. 7. Processing at the remote domain 420 begins with the arrival of a request from the local domain 405 at step 705. This request comprises a requested number of processing nodes, n, and a proposed payment, p, in return for the use of those nodes.

To evaluate this request, the on-demand manager 400 at the remote domain 420 determines the current value, v-current, of the processing at the remote domain 420 (step 710). The on-demand manager 400 at the remote domain 420 then determines a new value, v-new, of the processing at the remote domain 420 assuming the resources or nodes requested by the local domain 405 are assigned to the local domain 405 and not available to the remote domain 420 (step 715).

The on-demand manager 400 for the remote domain 420 determines the minimum acceptable payment, p-min, for the requested nodes at step 720. This minimum acceptable payment considers the change in the value the on-demand manager 400 at the remote domain 420 may receive based on the service level agreements it is currently fulfilling. The minimum acceptable payment also considers the profit required of remote requests by the on-demand manager 400 at the remote domain 420.

If the proposed payment, p, meets or exceeds the required minimum payment, p-min, as determined at decision step 725, the remote domain 420 accepts the request from the local domain 405 at step 730 for p value and n nodes. Otherwise, the remote domain 420 considers the original request unacceptable at decision step 725 and the remote domain 420 offers a counterproposal to the local domain 405 based on the calculated minimum value, p-min, for n nodes at step 735.

It is to be understood that the specific embodiments of the invention that have been described are merely illustrative of certain applications of the principle of the present invention. Numerous modifications may be made to the system, method, and service for supporting transaction and parallel services across multiple domains based on service level agreements described herein without departing from the spirit and scope of the present invention.

What is claimed is:

1. A method for supporting an application workload using at least one remote domain, the method comprising:
monitoring execution of the application workload to determine whether a threshold performance requirement of a service level agreement is met, wherein a monetary penalty amount is specified by the service level agreement if the threshold performance requirement is not met;
wherein if the threshold performance requirement is not met, sending a request for at least one additional resource to the at least one remote domain, wherein the request further includes a proposed payment;
receiving an offer from the at least one remote domain, wherein the offer is an acceptance offer if the at least one remote domain determines that the proposed payment is acceptable in accordance with a minimum acceptable payment that is calculated based upon the at least one additional resource and if the proposed payment is not acceptable, the offer is a counteroffer that includes at least an updated proposed payment;
wherein if the acceptance offer is received, allocating the at least one additional resource; and
wherein if the counteroffer is received, accepting the monetary penalty amount if the at least updated proposed payment is unacceptable.

2. The method of claim 1, wherein a first application workload executes on a first server cluster having a first domain and the at least one remote domain includes a second domain having a second server cluster running a second application workload further comprising:
monitoring execution of the first application workload to determine whether a performance requirement for execution of the first application workload specified in the service level agreement will continue to be met; and
responsive to a determination that the performance requirement for execution of the first application workload will not continue to be met, sending a request to the second domain to assign one or more of a plurality of server nodes in the second server cluster at the second domain to the execution of the first application workload.

3. The method of claim 2, wherein the first application workload is a transaction application workload.

4. The method of claim 3, wherein the transaction application workload comprises stock trades.

5. The method of claim 1, further comprising:
receiving a refusal from the at least one remote domain denying the request, the refusal from the at least one remote domain being based upon evaluation of an impact on a service level agreement negotiated for an application workload executing on the at least one remote domain if the request was granted.

6. The method of claim 1, wherein the proposed payment is a payment amount for a number of server nodes within the at least one additional resource requested.

7. The method of claim 1, wherein the at least one remote domain executes a parallel application workload.

8. The method of claim 7, wherein the parallel application workload involves optimization of a stock portfolio.

9. The method of claim 1, wherein the threshold performance requirement comprises any of a throughput requirement, a response time requirement, an availability requirement, and a downtime requirement.

10. The method of claim 1, wherein monitoring execution of the application workload comprises:
monitoring one or more of a transaction rate, a transaction response time, availability of a server node, and utilization of a server node.

11. The method of claim 1, wherein the minimum acceptable payment is determined in accordance with a determination of a value of processing operations performed at the at least one remote domain.

12. The method of claim 11, wherein the value of processing operations performed at the at least one remote domain is determined in accordance with a service level agreement of the remote domain.

13. The method of claim 1, wherein the request includes any of a request for at least one server node and a time duration for which the at least one server node is requested and the counteroffer specifies any of a different number of server nodes than the at least one server node requested and a different time duration.

14. An on-demand manager at a local domain executing an application workload, wherein the on-demand manager comprises a processor and a memory device coupled to the processor, wherein the memory device stores an application which, when executed by the processor, causes the processor to:
assign a subset of a plurality of server nodes to execute the application workload;
monitor execution of the application workload to determine whether a threshold performance requirement of a service level agreement is met, wherein a monetary penalty amount is specified by the service level agreement if the threshold performance requirement is not met;
send a request for at least one additional server node to the at least one remote domain if the threshold performance requirement is not met, wherein the request further includes a proposed payment and a time duration for which the at least one additional server node is needed;
receive an offer from the at least one remote domain, wherein the offer is an acceptance offer if the at least one remote domain determines that the proposed payment is acceptable in accordance with a minimum acceptable payment that is calculated based upon the at least one additional resource and if the proposed payment is not acceptable, the offer is a counteroffer that includes at least an updated proposed payment;
allocate the at least one additional resource if the acceptance offer is received; and
accept the monetary penalty amount if the at least updated proposed payment is unacceptable.

* * * * *